United States Patent
Slack

(10) Patent No.: US 8,739,607 B2
(45) Date of Patent: Jun. 3, 2014

(54) FIXTURE FOR EVALUATING A METAL-TO-METAL SEAL BETWEEN TUBULAR COMPONENTS AND METHOD OF USE OF SAME

(75) Inventor: Maurice Slack, Edmonton (CA)

(73) Assignee: Noetic Engineering 2008 Inc., Edmonton (CA)

( * ) Notice: Subject to any disclaimer, the term of this patent is extended or adjusted under 35 U.S.C. 154(b) by 240 days.

(21) Appl. No.: 13/203,972

(22) PCT Filed: Mar. 16, 2010

(86) PCT No.: PCT/CA2010/000375
§ 371 (c)(1),
(2), (4) Date: Aug. 30, 2011

(87) PCT Pub. No.: WO2010/105344
PCT Pub. Date: Sep. 23, 2010

(65) Prior Publication Data
US 2012/0000273 A1    Jan. 5, 2012

Related U.S. Application Data

(60) Provisional application No. 61/160,643, filed on Mar. 16, 2009.

(51) Int. Cl.
*G01M 3/08*        (2006.01)
(52) U.S. Cl.
USPC ............................................... 73/49.1; 73/46
(58) Field of Classification Search
USPC .......... 73/37, 40, 46, 49.1, 49.5, 49.8; 138/90
See application file for complete search history.

(56) References Cited

U.S. PATENT DOCUMENTS

| 2,155,602 A | 4/1939 | Keulers |
| 2,241,526 A | 5/1941 | Rosenkranz |

(Continued)

FOREIGN PATENT DOCUMENTS

CA        1 170 476        7/1984

OTHER PUBLICATIONS

International Preliminary Report on Patentability dated Jan. 24, 2011, issued in corresponding International Application No. PCT/CA2010/000375, filed Mar. 16, 2010, 5 pages.

(Continued)

*Primary Examiner* — Randy W Gibson
*Assistant Examiner* — Natalie Huls
(74) *Attorney, Agent, or Firm* — Christensen O'Connor Johnson Kindness PLLC

(57) ABSTRACT

A fixture for evaluating a metal-to-metal seal. A first metal seal surface and a second metal seal surface are brought into initial contact by engagement of a male connection of a first tubular component and a female connection of a second tubular component to form a metal-to-metal seal. A contact pressure regulator is provided to alter the contact load acting in the interfacial region between the first metal seal surface and the second metal seal surface in a predictable manner. An inlet passage is provided to communicate test fluid to an inlet side of the metal-to-metal seal. An outlet passage is provided on an outlet side of the metal-to-metal seal. In accordance with the method, a capacity of the metal-to-metal seal is expressed as the pressure differential required to just induce leakage given a measure of absolute contact load greater than zero.

12 Claims, 5 Drawing Sheets

(56) References Cited

U.S. PATENT DOCUMENTS

| | | | |
|---|---|---|---|
| 2,246,885 A | 6/1941 | Jones | |
| 2,663,183 A | 12/1953 | Huhn | |
| 2,695,632 A | 11/1954 | Brock | |
| 3,653,254 A * | 4/1972 | Simon | 73/46 |
| 3,803,901 A | 4/1974 | McConnell | |
| 4,407,171 A | 10/1983 | Hasha | |
| 4,577,488 A * | 3/1986 | Broadus et al. | 73/40 |
| 4,617,823 A | 10/1986 | Lazes | |
| 4,646,559 A | 3/1987 | Toelke | |
| 4,733,554 A | 3/1988 | Lazes | |
| 5,148,870 A | 9/1992 | Fernandez | |
| 5,209,105 A | 5/1993 | Hasha | |
| 5,461,905 A | 10/1995 | Penisson | |
| 6,026,675 A * | 2/2000 | Jansch | 73/49.5 |
| 7,219,736 B1 | 5/2007 | Levy | |
| 2008/0223113 A1 | 9/2008 | Dutilleul | |

OTHER PUBLICATIONS

International Search Report mailed Jun. 4, 2010, issued in corresponding International Application No. PCT/CA2010/00375, filed Mar. 16, 2010, 4 pages.

\* cited by examiner

FIXTURE FOR EVALUATING A METAL-TO-METAL SEAL BETWEEN TUBULAR COMPONENTS AND METHOD OF USE OF SAME

FIELD

This invention pertains to a fixture for evaluating a metal-to-metal seal between tubular components, and in particular, the quality of seals for threaded connections used to complete wells drilled in earth materials.

BACKGROUND

Testing systems used in the prior art tend to test the sealing performance of the entire connection system and do not characterize the sealing performance of the metal-to-metal seal alone. It will be understood that the term metal-to-metal seal is known in the art to include annular seals formed in a region where an interval of continuous contact is provided between mating solid components of similar stiffness wherein a thin film of material may be disposed in the interfacial region of the contacting interval, the thin film of material typically comprised of lubricant film, compressed thread compound paste, and/or surface coating carried by one or both of the mating components.

By way of example, with U.S. Pat. No. 3,653,254 (Simon) entitled "Leak-testing internal seals in pipe joints" the test fluid media is applied externally with a driving differential test pressure that must force sufficient test fluid to pass through the connection thread to first reach the internal metal-to-metal seal and subsequently continue to flow so as to increase the differential pressure across the seal to substantially that of the driving pressure, so as to meet the condition for detection of leakage under a known pressure differential. The connection threads are coated with a thread compound paste to provide lubrication and prevent galling. This thread compound paste typically contains solids and has plastic and thixotropic fluid phase properties. When trapped between thread surfaces it can thus restrict or impede the flow of the externally applied fluid when the clearance between thread surfaces is small. Thus, this method may not reliably evaluate the sealing performance of the metal-to-metal seal separate from the sealing performance of thread compound trapped within the thread, i.e., the driving pressure for leakage past the metal-to-metal seal may not be reliably known as it can depend on the pressure drop of fluid across the thread due to both time dependent viscous characteristics or blockage.

This and other similar test methodologies characteristically provide pass/fail characterization of seal integrity and do not lend themselves to the quantitative definition of seal capacity relative to applied loads.

SUMMARY

According to one aspect of the present disclosure, there is provided a fixture for evaluating a metal-to-metal seal between tubular components. A first tubular component is provided carrying a first metal seal surface and having a male connection. A second tubular component is provided carrying a second metal seal surface and having a female connection. The first metal seal surface and the second metal seal surface are brought into initial contact by an engagement of the male connection of the first tubular component and the female connection of the second tubular component to form a metal-to-metal seal. A contact stress regulator is provided to control load acting between the first tubular component and the second tubular component to alter the contact load acting in the interfacial region between the first metal seal surface and the second metal seal surface in a predictable manner. An inlet passage is provided to communicate test fluid to an inlet side of the metal-to-metal seal. An outlet passage is provided on an outlet side of the metal-to-metal seal.

According to another aspect, there is provided a method for evaluating a metal-to-metal seal between tubular components. A first step involves providing a fixture as described above. A second step involves engaging the male connection of the first tubular component and the female connection of the second tubular component to bring the first metal seal surface and the second metal seal surface into initial contact. A third step involves directing a test fluid under pressure through the inlet passage to the inlet side of the metal-to-metal seal to apply a pressure differential across the metal-to-metal seal. A fourth step involves monitoring the outlet passage for leakage of test fluid while inducing sufficient pressure to just cause the onset of leakage and determining a measure of contact load acting between the first metal seal surface and the second metal seal surface. A fifth step involves calculating a measure of a capacity of the metal-to-metal seal as a pressure differential required to just induce leakage given a measure of absolute contact load greater than zero.

The most common form of engagement between tubular components is a rotational engagement, typically, a threaded engagement. However, as the functioning of the metal-to-metal seal is being isolated from other aspects of the coupling, the actual form of engagement used is irrelevant to the operation of both the fixture and the method. As is known to persons skilled in the art, there are a wide variety of engagements from which to choose.

There are various mechanisms that can be provided as a contact stress regulator to control load acting between the first tubular component and the second tubular component to alter the contact load of the first metal seal surface and the second metal seal surface in a predictable manner independent of the engagement between the male connection of the first tubular component and the female connection of the second tubular component. Such load control mechanisms can be incorporated internally within the fixture or applied externally to the fixture. There are various mechanical mechanisms that are workable. It is preferred that the mechanism to control load be independent of the interference between the male connection of the first tubular component and the female connection of the second tubular component. In the description which follows, a preferred mechanism which will be described is a pressure chamber positioned in an annulus between the first tubular component and the second tubular component. The pressure chamber reduces the contact stress by causing relative movement of the first tubular component and the second tubular component when fluid pressure is applied to the pressure chamber.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A fixture for evaluating a metal-to-metal seal between tubular components will now be described with reference to FIG. 1 through 6.

This invention aims to overcome the disadvantages of the prior art and provide a better method of evaluating the efficacy of metal-to-metal seals used in threaded connections. In such pipe connections, a standard practice is to apply a thread compound to the threads and to the metal-to-metal seal surfaces to prevent galling during make-up/assembly. A thin layer of the thread compound is trapped between the two seal surfaces during make-up and becomes an integral interfacial component of the metal-to-metal seal. Other interfacial seal components would include any coatings applied to the sealing surfaces prior to make-up such as, for example, manganese phosphate. In the process of developing this invention, it was learned and demonstrated that these interfacial components strongly affect seal performance; thus, the term metal-to-metal seal implicitly includes any interfacial component.

To provide an effective barrier against fluid leakage, no gap can exist between the two sealing surfaces of a metal-to-metal seal unless such gap is filled by an interfacial component. The physical limit at which a theoretically perfect metal-to-metal seal can prevent fluid leakage is where the contact force between the two sealing surfaces at any location reaches zero, with no gap between the surfaces. This invention provides a method of quantitatively evaluating the efficacy of a practical seal relative to this physical limit for a theoretically perfect seal by measuring the relationship between the rate of fluid leakage past the seal and the contact intensity between the two sealing surfaces, where the contact intensity at any circumferential location along the seal is defined as the total contact force acting between the sealing surfaces per unit of circumferential length.

Figure 1:
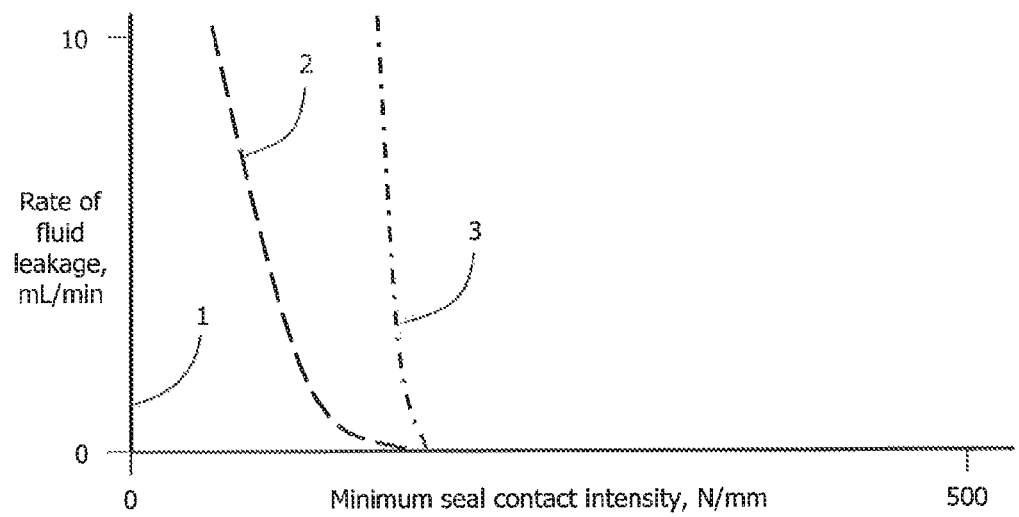
FIG. 1 is a plot of the rate of fluid leakage past the metal-to-metal seal versus the contact intensity between the two sealing surfaces.
Figure 2:
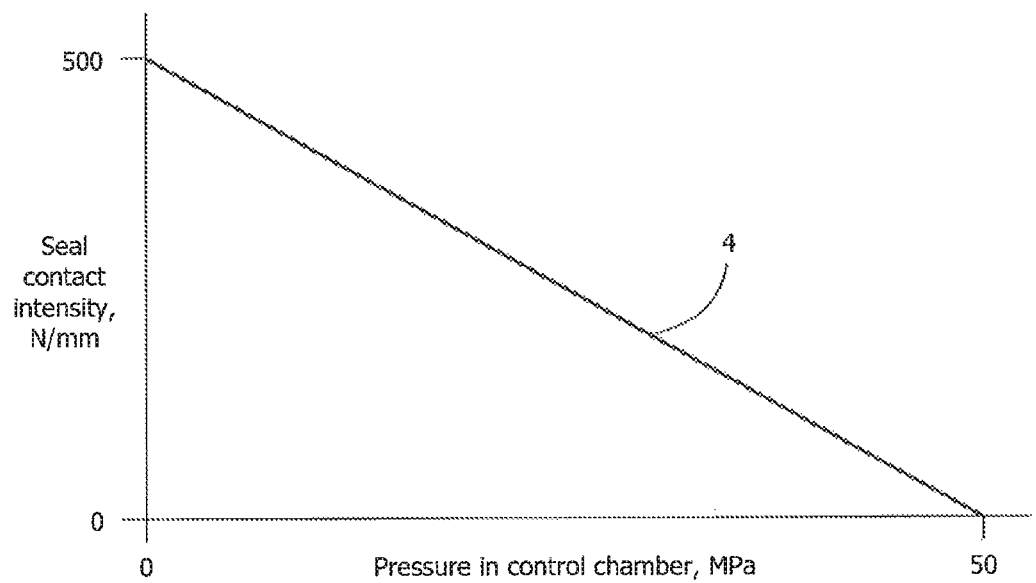
FIG. 2 is a plot of the metal-to-metal seal contact intensity versus the pressure applied in the control chamber determined by mathematical modeling of the structural response.
Figure 3:
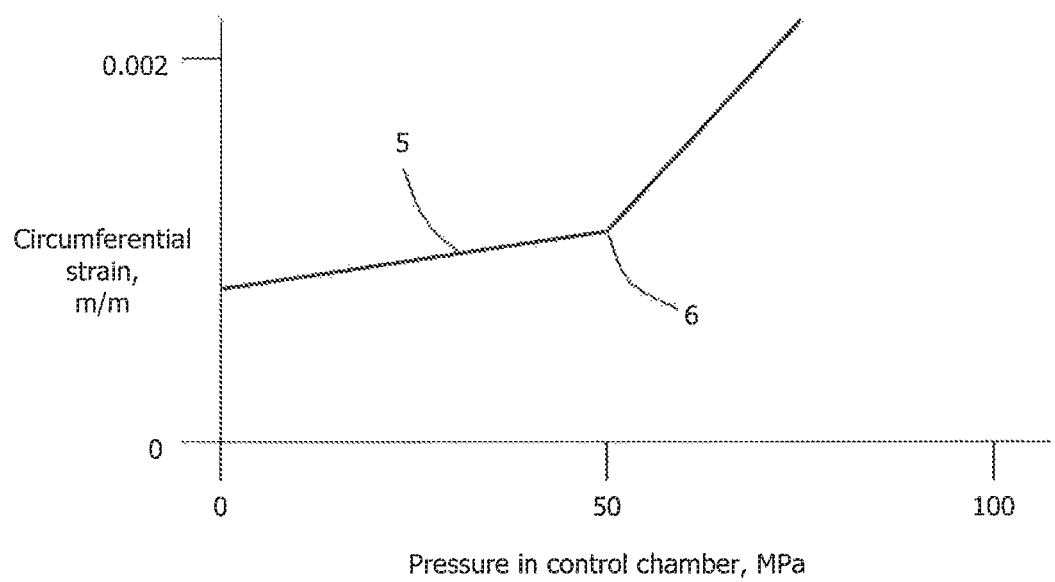
FIG. 3 is a plot of the circumferential (hoop) strain of the apparatus versus the pressure applied in the control chamber.

The invention quantitatively evaluates the efficacy of metal-to-metal seals relative to a deterministic physical limit for perfect seals and provides a means to investigate specific parameters relevant to good seal function independently of one another. The physical limit of sealing for perfect seals is the point of initial separation of the two sealing surfaces, where the minimum contact intensity between the two sealing surfaces at any location reaches zero with no gap between the surfaces. Sealing performance is quantified by measuring the relationship between the rate of fluid leakage past the seal and the contact intensity between the two sealing surfaces as illustrated in FIG. 1. Curve 1 shows the relationship between the rate of fluid leakage and the contact intensity for a theoretically perfect seal. No leakage past the seal occurs unless the contact intensity of the seal equals zero. Curve 2 shows an example of a measured relationship between the rate of fluid leakage past a typical physical metal-to-metal seal and the contact intensity between two sealing surfaces with interfacial components. Leakage past the seal occurs when the contact intensity of the seal is greater than zero. The rate of leakage increases as the contact intensity decreases. Curve 3 shows another example relationship for a typical physical metal-to-metal seal with interfacial components. The shape and position of a seal performance curve depends on the statistical repeatability of the measurement and on seal design variables such as seal surface geometry, surface finish, and the properties of any interfacial components such as surface coatings and thread compound.

Preferred Embodiment

Figure 4:
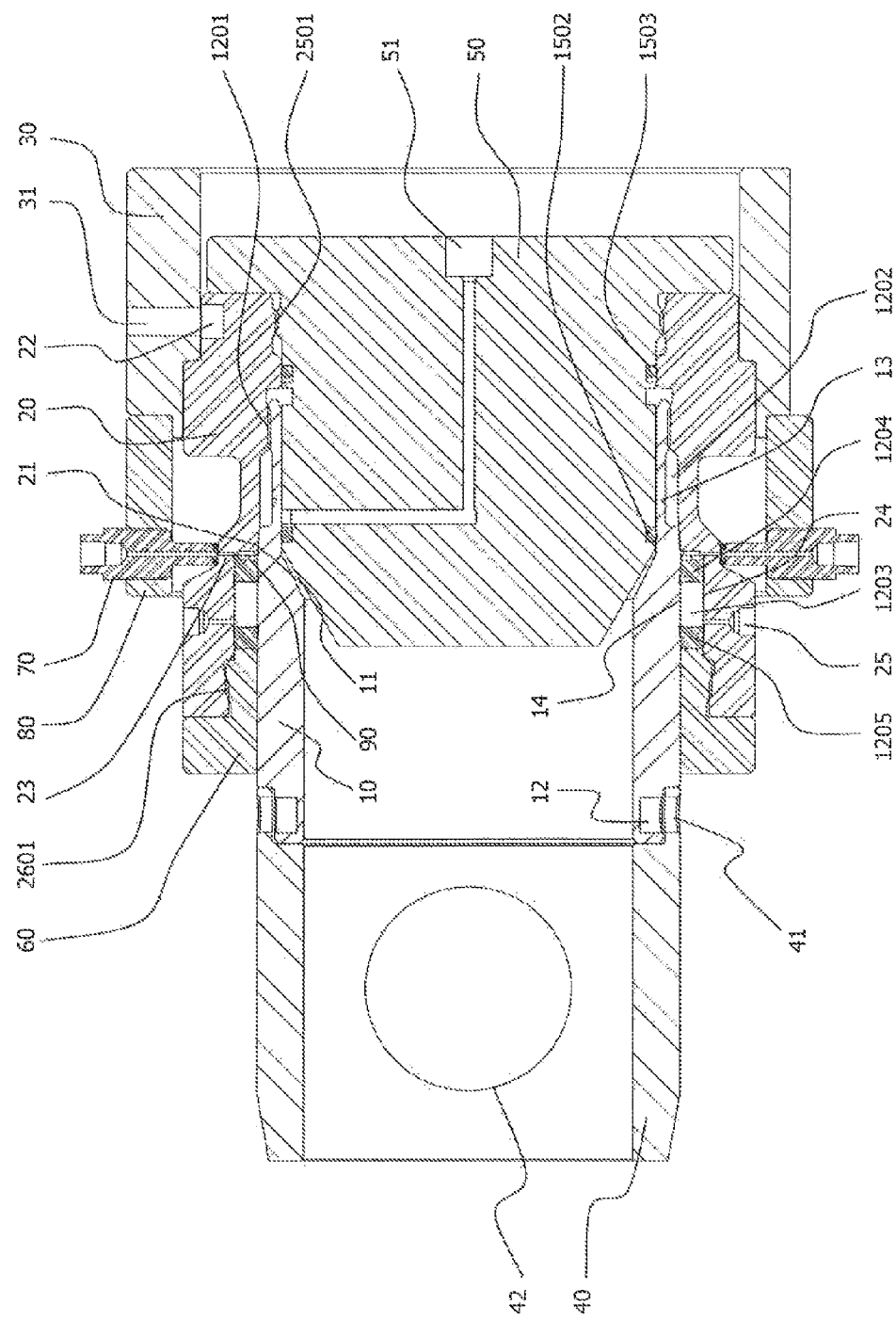
FIG. 4 is a longitudinal cross-section of the invention in the preferred embodiment.

FIG. 4 shows the preferred embodiment of the apparatus for evaluating the efficacy of metal-to-metal seals. Male component 10 with a sealing surface 11 of the metal-to-metal seal is mated by threads 1201 to female component 20 with a facing sealing surface 21 of the metal-to-metal seal with a predictable contact load distribution that can be either circumferentially uniform or non-uniform. Male component 10 is assembled to female component 20 by applying sufficient relative rotation between the two components so that the desired initial contact force between the seal surfaces is achieved. Any means that provides accurate relative rotation of the two components can be used. In the preferred embodiment of the invention apparatus, female component 20 is held stationary to fixed base 30 by one or more rods inserted through holes 31 and 22. The male component 10 is held to coupling 40 by one or more rods inserted through holes 41 and 12. Coupling 40 and male component 10 are rotated by applying a torque to coupling 40. In the preferred embodiment, the torque is created by applying a force tangential to the axis of thread 1201 at a selected distance from the axis via a suitable lever inserted through hole 42. Use of coupling 40 is optional and torque can be applied directly to the male component 10 to effect the desired rotation relative to female component 20.

An annular space 1202 is formed by male component 10, female component 20 and plug 50. To test the fluid barrier formed by sealing surfaces 11 and 21, a test fluid is applied through port 51 located in plug 50. Plug 50 is mated to female component 20 by threads 2501. One or more holes 13 ensure that the test fluid from port 51 reaches annular space 1202 next to the metal-to-metal seal. Any leakage of the test fluid past the metal-to-metal seal is detected by connecting an appropriate fluid flow measurement device, such as a gas bubble counter, to fitting 70 that seals with an o-ring to port 23 located in female component 20 behind the metal-to-metal seal and held in place by ring 80.

The apparatus incorporates a contact stress regulator which has a mechanism for reducing the seal contact stress after make-up (assembly). Typically this is achieved by applying a fluid pressure in a control chamber located near the test seal. A mechanical mechanism could also be used to reduce the seal contact stress. In a preferred embodiment, control chamber 1203 is formed by exterior surface 14 of the male component 10, interior surface 24 of female component 20, and sealing elements 1204 and 1205. Sealing element 1204 is held in place by spacer 90 which is grooved to ensure fluid leaking past the seal can reach port 23. Sealing element 1205 is held in place by ring 60 which is mated to female component 20 by thread 2601. Fluid pressure is applied to control chamber 1203 through port 25 in female component 20. A second function of sealing element 1205 is to ensure that any test fluid leaking past the metal-to-metal seal enters port 23 and subsequently, the flow measurement device. The preferred embodiment of the apparatus allows ring 60 and sealing elements 1204 and 1205 to be removed and reinstalled any time before or after assembly of male component 10 to female component 20. Plug 50 may be installed in female component 20 prior to assembly of male component 10 to female component 20 to help align the two components.

The size and position of control chamber 1203 relative to the location of the metal-to-metal seal is selected such that the contact stress reduces in a predictable manner when fluid pressure is applied to the chamber. The relationship between the pressure applied to control chamber 1203 and the contact intensity of the metal-to-metal seal can be determined by mathematical modeling of the system structural response, one such method is known in the art as finite element analysis. Curve 4 in FIG. 2 indicates the relationship for a specific version of the preferred embodiment of the invention. A number of means are available for determining the separation point between seal surfaces, when the contact intensity reaches zero, as the control pressure is increased, which is the physical limit for sealing of a theoretically perfect seal. One such means is the aforementioned finite element analysis. Another means is to observe the change in the stiffness of the apparatus when separation occurs. The separation point can be identified from measurements of circumferential (hoop) strain on the male or female component and the control pressure as shown by Curve 5 in FIG. 3. When seal separation occurs there is a distinct change in the relationship between the circumferential strain and the control pressure as indicated by point 6.

First Alternate Embodiment

Figure 5:
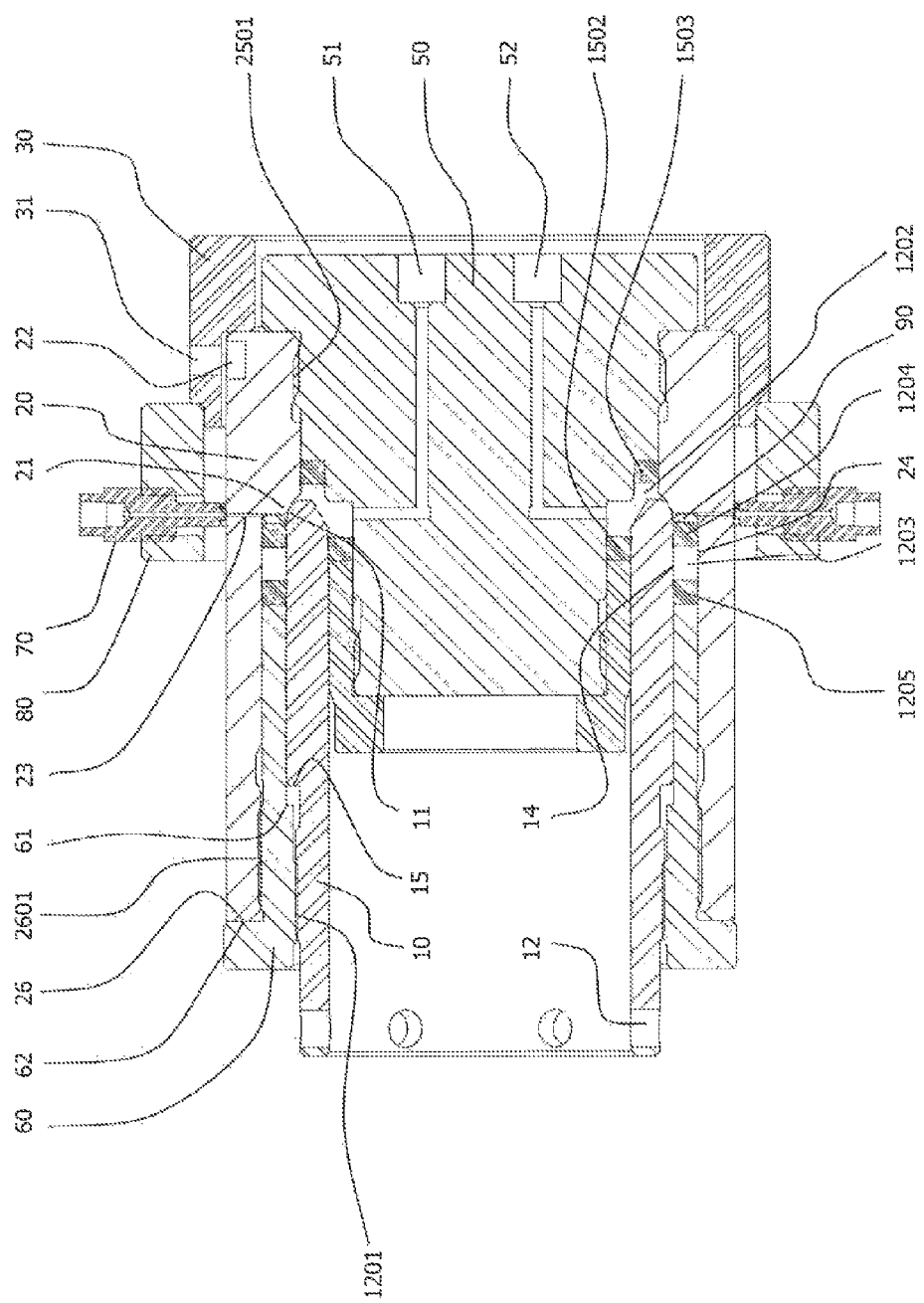
FIG. 5 is a longitudinal cross-section of the invention in a first alternate embodiment.

FIG. 5 shows a first alternate embodiment of the apparatus for evaluating the efficacy of metal-to-metal seals. Male component 10 with a sealing surface 11 of the metal-to-metal seal is mated by threads 1201, ring 60, and thread 2601 to female component 20 with a facing sealing surface 21 of the metal-to-metal seal. The apparatus is assembled by threading ring 60 on to male component 10 until shoulders 61 and 15 lightly touch. Sealing elements sealing elements 1204 and 1205 are placed in female component 20 and on male component 10, respectively. Then, ring 60 and male component 10 are threaded together in to female component 20 via threads 2601 until shoulders 62 and 26 firmly touch. At this point in the assembly, there is no contact between sealing surfaces 11 and 21. The final step in the assembly is to apply sufficient relative rotation between male component 10 and ring 60, which at this point is fixed relative to female component 20, so that the desired initial contact force between the seal surfaces is achieved. Any means that provides accurate relative rotation of the two components can be used. The means used in the alternate embodiment of the invention apparatus shown in FIG. 5 is similar to the means used in the preferred embodiment. Female component 20 is held stationary to fixed base 30 by one or more rods inserted through holes 31 and 22. The male component 10 is held to a coupling similar to that used in the preferred embodiment by one or more rods inserted through holes in the coupling and holes 12. The coupling and male component 10 are rotated relative to female component 20 in a manner similar to that in the preferred embodiment.

To test the fluid barrier formed by sealing surfaces 11 and 21, a test fluid is applied through port 51 and/or 52 located in plug 50 leading to annular space 1202 next to the metal-to-metal seal. Plug 50 is mated to female component 20 by threads 2501. Any leakage of the test fluid past the metal-to-metal seal is detected by connecting an appropriate fluid flow measurement device, such as a gas bubble counter, to fitting 70 that seals with an o-ring to port 23 located in female component 20 behind the metal-to-metal seal and held in place by ring 80.

In the alternate embodiment of the invention apparatus shown in FIG. 5, control chamber 1203 is formed by exterior surface 14 of the male component 10, interior surface 24 of female component 20, and sealing elements 1204 and 1205. Sealing element 1204 is held in place by spacer 90 which is grooved to ensure fluid leaking past the seal can reach port 23. Sealing element 1205 is held in place by ring 60 which is mated to female component 20 by thread 2601. Fluid pressure is applied to control chamber 1203 through a port located in female component 20. In the alternate embodiment shown in FIG. 5, the port for applying fluid pressure to control chamber 1203 is not visible because it is not located in the plane of the cross-section. A second function of sealing element 1205 is to ensure that any test fluid leaking past the metal-to-metal seal enters port 23 and subsequently, the flow measurement device. The size and position of control chamber 1203 relative to the location of the metal-to-metal seal is selected such that the contact stress reduces in a predictable manner when fluid pressure is applied to the chamber. The relationship between the pressure applied to control chamber 1203 and the contact intensity of the metal-to-metal seal can be determined as described previously for the preferred embodiment of the apparatus. A number of means are available for determining the separation point between seal surfaces as described previously for the preferred embodiment of the apparatus.

Second Alternate Embodiment

Figure 6:
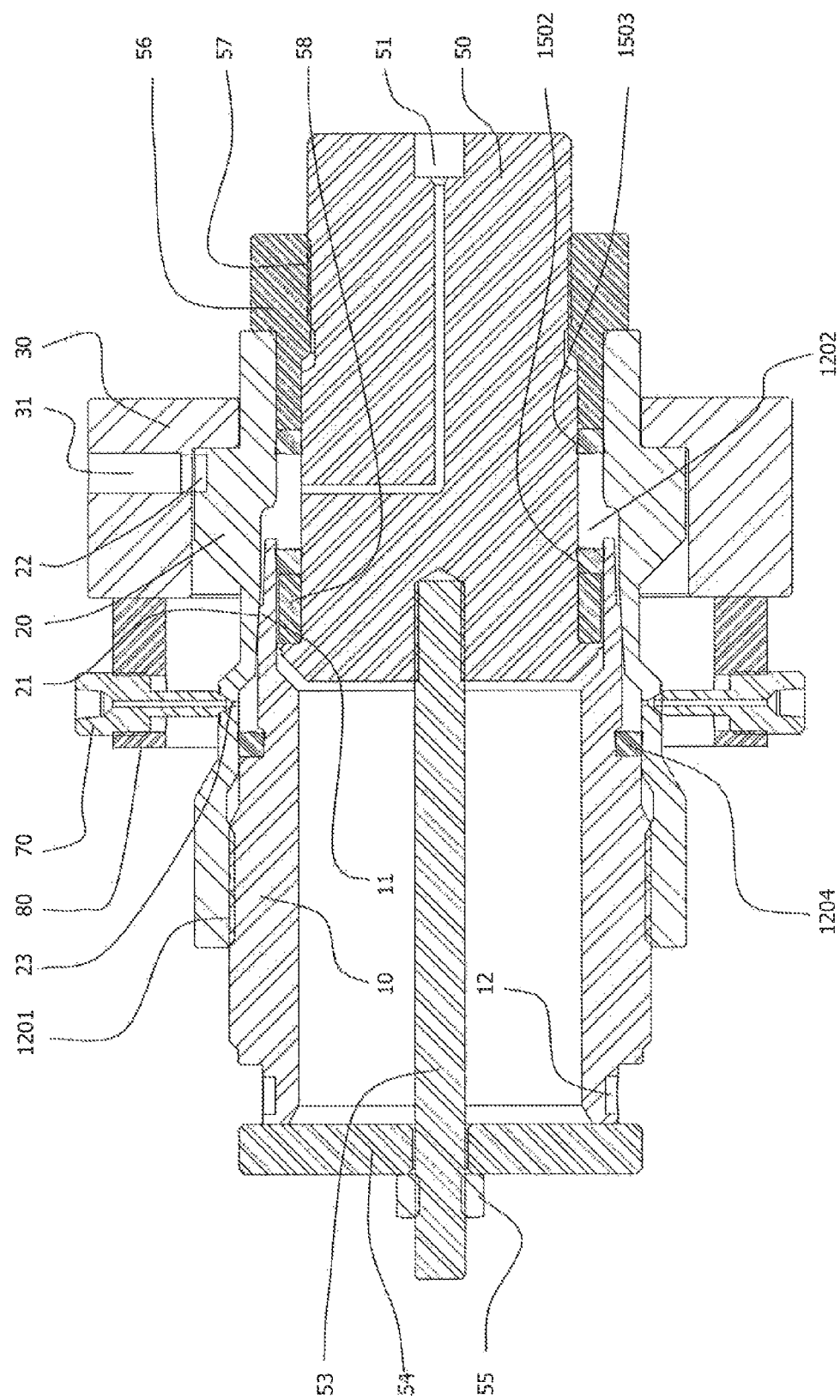
FIG. 6 is a is a longitudinal cross-section of the invention in a second alternate embodiment

FIG. 6 shows a second alternate embodiment of the apparatus for evaluating the efficacy of metal-to-metal seals. Male component 10 with a sealing surface 11 of the metal-to-metal seal is mated by threads 1201 to female component 20 with a facing sealing surface 21 of the metal-to-metal seal. Male component 10 is assembled to female component 20 by applying sufficient relative rotation between the two components so that the desired initial contact force between the seal surfaces is achieved. Any means that provides accurate relative rotation of the two components can be used. The means used in the alternate embodiment of the invention apparatus shown in FIG. 6 is similar to the means used in the preferred embodiment. Female component 20 is held stationary to fixed base 30 by one or more rods inserted through holes 31 and 22. The male component 10 is held to a coupling similar to that used in the preferred embodiment by one or more rods inserted through holes in the coupling and holes 12. The coupling and male component 10 are rotated relative to female component 20 in a manner similar to that in the preferred embodiment.

To test the fluid barrier formed by sealing surfaces 11 and 21, a test fluid is applied through port 51 located in plug 50 leading to annular space 1202 next to the metal-to-metal seal. Plug 50 is held in place by threaded rod 53, cap 54, and nut 55. Ring 56 is seated within female component 20. The axial position of plug 50 relative to ring 56 and thus, female component 20 and male component 10 can be adjusted with threads 57. The axial position of sealing element 1502 relative to plug 50 and thus, ring 56, female component 20 and male component 10 can be adjusted by changing the axial length of ring 58. Any leakage of the test fluid past the metal-to-metal seal is detected by connecting an appropriate fluid flow measurement device, such as a gas bubble counter, to fitting 70 that seals with metal-to-metal seal to port 23 located in female component 20 behind the metal-to-metal seal and held in place by ring 80. Sealing element 1204 acts to ensure that any test fluid leaking past the metal-to-metal seal enters port 23 and subsequently, the flow measurement device.

In the second alternate embodiment of the invention apparatus shown in FIG. 6, fluid pressure applied to annular space 1202 through port 51 acts not only to drive leakage through the metal-to-metal seal but also acts to reduce the seal contact intensity. The selected axial position of sealing element 1502 relative to the location of the metal-to-metal seal controls the relationship between the seal contact intensity and the applied fluid pressure. The position of sealing element 1502 is selected so that the contact intensity reduces in a predictable manner when fluid pressure is increased. The relationship between the pressure applied to annular space 1202 and the contact intensity of the metal-to-metal seal can be determined as described previously for the preferred embodiment of the apparatus. A number of means are available for determining the separation point between seal surfaces as described previously for the preferred embodiment of the apparatus.

It will be apparent to one skilled in the art that the present invention can be practiced with non-uniform tubular elements as long as they are substantially axisymmetric so as to respond to changes in pressure in a predictable manner.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A fixture for evaluating a metal-to-metal seal between tubular components, comprising:
    a first tubular component carrying a first metal seal surface and having a male connection;
    a second tubular component carrying a second metal seal surface and having a female connection;
    the first metal seal surface and the second metal seal surface being brought into contact by an engagement of the male connection of the first tubular component and the female connection of the second tubular component to form the metal-to-metal seal, the metal-to-metal seal having a contact load that acts in an interfacial region between the first metal seal surface and the second metal seal surface;
    a contact stress regulator to control the contact load acting between the first tubular component and the second tubular component to alter the contact load in a predictable manner;
    an inlet passage being provided to communicate a test fluid to an inlet side of the metal-to-metal seal and an outlet passage on an outlet side of the metal-to-metal seal; and
    one or more sensors for measuring the pressure differential between the inlet side and the outlet side of the metal-to-metal seal in isolation from any prior or sequential seals through which the test fluid may tend to pass including those that may form part of the engagement between the male connection of the first tubular component and the female connection of the second tubular component.

2. The fixture of claim 1, wherein the engagement is a rotational engagement.

3. The fixture of claim 1, wherein the contact stress regulator is independent of the engagement between the male connection of the first tubular component and the female connection of the second tubular component.

4. The fixture of claim 1, wherein the contact stress regulator is a pressure chamber positioned in an annulus between the first tubular component and the second tubular component, which reduces the contact load by causing relative movement between the first tubular component and the second tubular component when fluid pressure is applied to the pressure chamber.

5. The fixture of claim 1, wherein the pressure differential is measured immediately across the metal-to-meal seal.

6. The fixture of claim 1, wherein the contact stress regulator reduces the contact load.

7. A method of quantifying the capacity of a metal-to-metal seal between tubular components, comprising:
    providing a fixture, comprising:
        a first tubular component carrying a first metal seal surface and having a male connection;
        a second tubular component carrying a second metal seal surface and having a female connection;
        the first metal seal surface and the second metal seal surface being brought into contact by an engagement of the male connection of the first tubular component and the female connection of the second tubular component to form the metal-to-metal seal, the metal-to-metal seal having a contact load that acts in an interfacial region between the first metal seal surface and the second metal seal surface;
        a contact stress regulator to control the contact load acting between the first tubular component and the second tubular component to alter the contact load in a predictable manner;
        an inlet passage being provided to communicate a test fluid to an inlet side of the metal-to-metal seal and an outlet passage on an outlet side of the metal-to-metal seal; and
        one or more sensors for measuring the pressure differential between the inlet side and the outlet side of the metal-to-metal seal in isolation from any prior or sequential seals through which the test fluid may tend to pass including those that may form part of the engagement between the male connection of the first tubular component and the female connection of the second tubular component;
    engaging the male connection of the first tubular component and the female connection of the second tubular component to bring the first metal seal surface and the second metal seal surface into contact;
    controlling the contact load acting between the first tubular component and the second tubular component;
    directing the test fluid under pressure through the inlet passage to the inlet side of the metal-to-metal seal to apply a pressure differential across the metal-to-metal seal;
    monitoring for the onset of leakage at the outlet passage while inducing sufficient pressure to just cause the onset of leakage and determining a measure of the contact load acting between the first metal seal surface and the second metal seal surface; and
    calculating a measure of a capacity of the metal-to-metal seal as the pressure differential across the metal-to-metal seal just induces leakage as the contact load acting between the first seal surface and the second seal surface of the metal-to-metal seal is reduced.

8. The method of claim 7, wherein the contact stress regulator is independent of the engagement between the male connection of the first tubular component and the female connection of the second tubular component.

9. The method of claim 7, wherein the contact stress regulator is a pressure chamber positioned in an annulus between the first tubular component and the second tubular component, which reduces the contact load by causing relative movement between the first tubular component and the second tubular component when fluid pressure from a pressure fluid is applied to the pressure chamber.

10. The method of claim 9, wherein the test fluid is also used as the pressure fluid.

11. The method of claim 7, wherein the pressure differential is measured immediately across the metal-to-meal seal.

12. The method of claim 7, wherein controlling the contact load comprises reducing the contact load.

* * * * *